F. REAUGH.
PUMP OR MOTOR.
APPLICATION FILED MAR. 2, 1905.
1,136,976.
Patented Apr. 27, 1915.
3 SHEETS—SHEET 1.
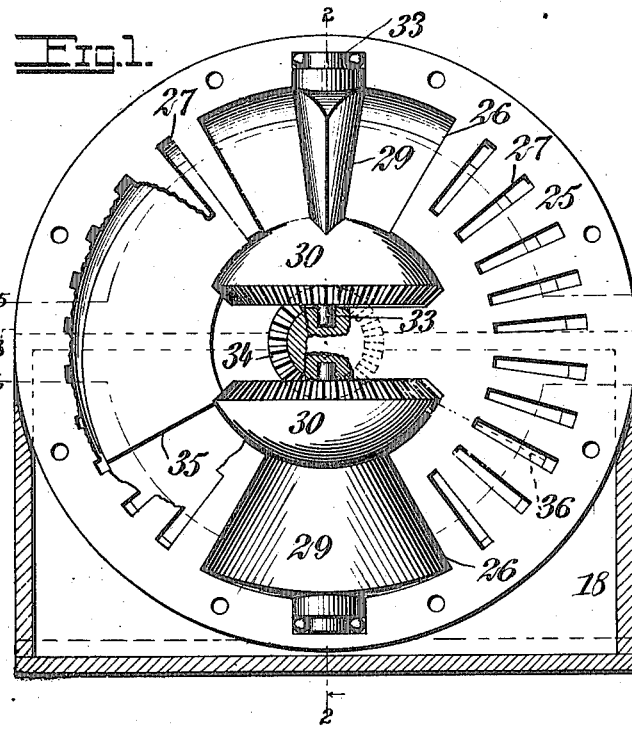
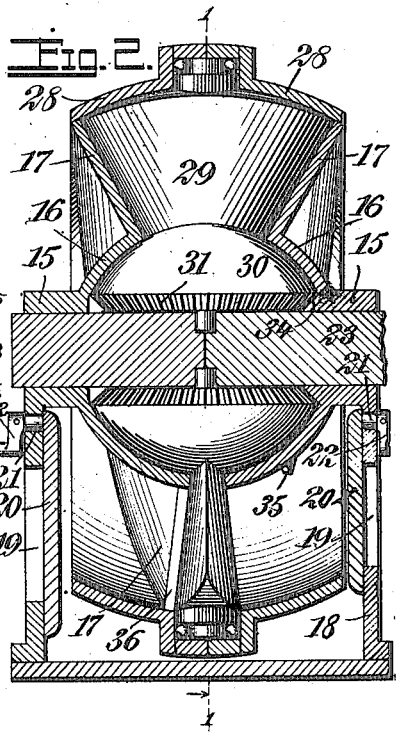
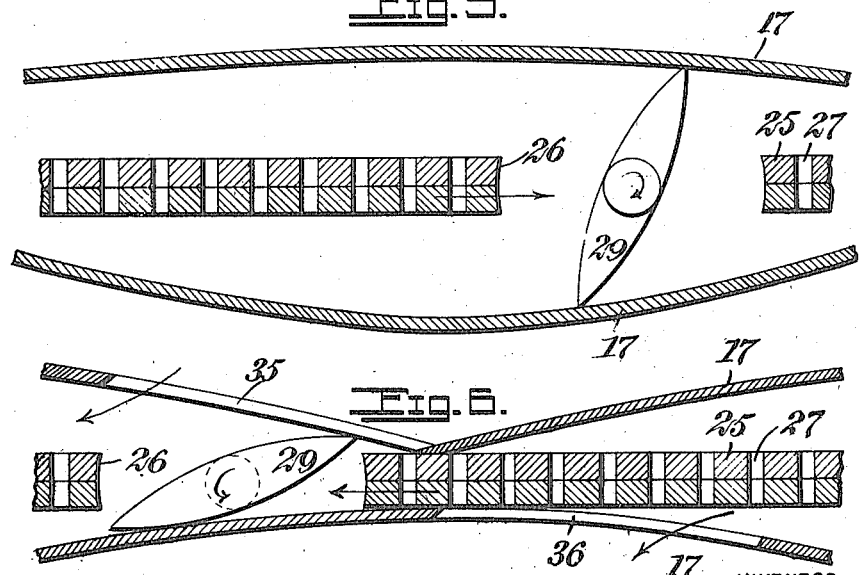
WITNESSES:
L. Almquist
Isaac B. Owens
INVENTOR
Frank Reaugh
BY
ATTORNEYS F. REAUGH.
PUMP OR MOTOR.
APPLICATION FILED MAR. 2, 1905.
1,136,976.
Patented Apr. 27, 1915.
3 SHEETS—SHEET 2.
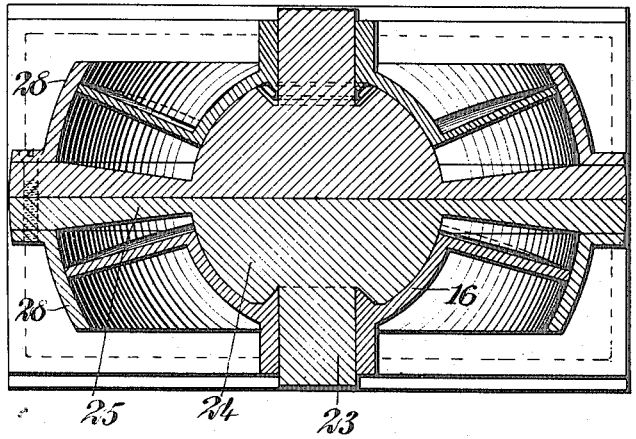
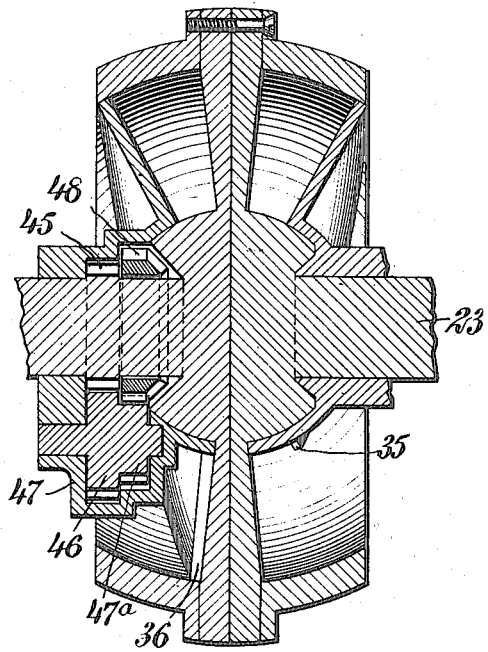
WITNESSES:
L. Almquist
Isaac B. Owens.
INVENTOR
Frank Reaugh
BY
ATTORNEYS F. REAUGH.
PUMP OR MOTOR.
APPLICATION FILED MAR. 2, 1905.
1,136,976.
Patented Apr. 27, 1915.
3 SHEETS—SHEET 3.
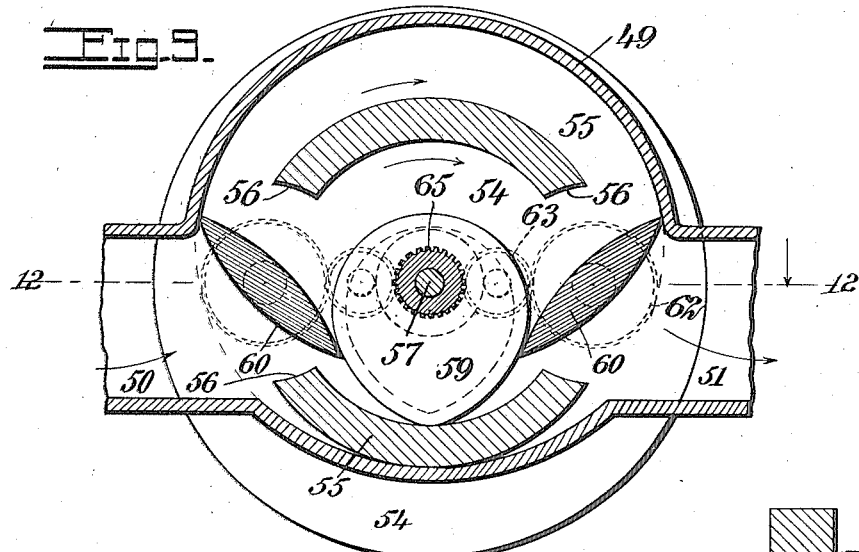
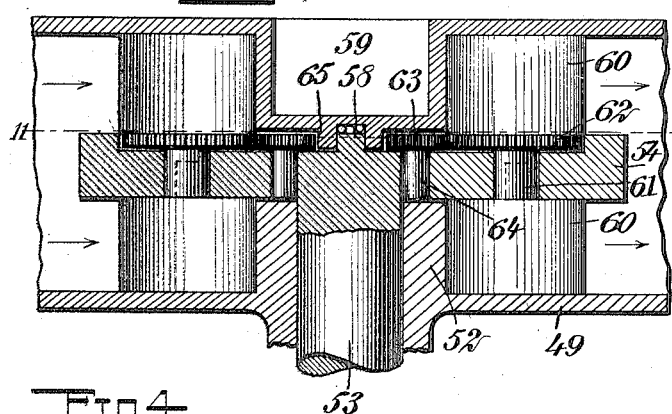
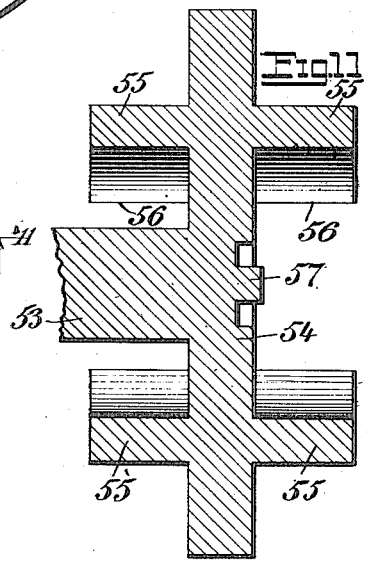
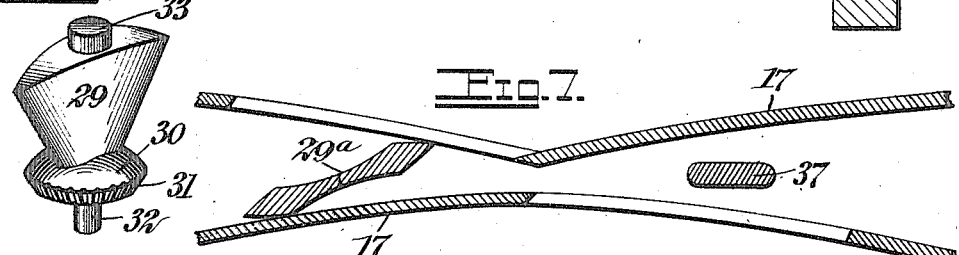
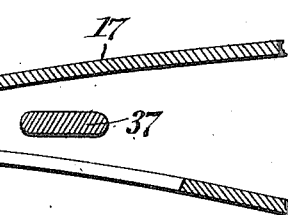
WITNESSES:
L. Almquist
Isaac B. Owens.
INVENTOR
Frank Reaugh
BY
ATTORNEYS

UNITED STATES PATENT OFFICE.

FRANK REAUGH, OF OAK CLIFF, TEXAS.

PUMP OR MOTOR.

1,136,976.  Specification of Letters Patent.  Patented Apr. 27, 1915.

Application filed March 2, 1905. Serial No. 248,054.

*To all whom it may concern:*

Be it known that I, FRANK REAUGH, a citizen of the United States, and a resident of Oak Cliff, in the county of Dallas and State of Texas, have invented a new and Improved Pump or Motor, of which the following is a full, clear, and exact description.

The invention is designed particularly as a pump or compressor, although by a mere reversal of its operation it may serve as a motor, as will be fully understood by persons skilled in the art.

The apparatus to which my invention relates is of the rotary type, comprising an inclosing shell or casing with inlet and outlet openings or ports in its walls, preferably at the sides near the periphery, in which casing is arranged a piston blade or blades, the casing and blade having relatively circular movement, and the blade in addition having a turning movement around an axis radial of the casing. In the type of the invention here illustrated, the casing is stationary, the blade or blades having both circular and turning movements. Interiorly the casing has a definite form, and the piston blade is associated with positive gearing for causing it to turn around said radial axis at a fixed rate corresponding exactly to the interior form of the casing, so that notwithstanding the turning of the piston blade it maintains true contact with the inner walls of the casing, thus preventing leakage, the compression or other action of the apparatus depending upon the aforesaid form and movements of the parts.

Reference is to be had to the accompanying drawings which illustrate as examples several types and applications of my invention, in which drawings like characters of reference indicate like parts in the several views, and in which—

Figure 1 is a sectional elevation on substantially the line 1—1 of Fig. 2. Fig. 2 is a cross section on the line 2—2 of Fig. 1; Fig. 3 is a horizontal section on the line 3—3 of Fig. 1; Fig. 4 is a detail perspective showing one of the piston blades which are employed in the form of the invention illustrated in Figs. 1, 2 and 3; Fig. 5 is a fragmentary section taken along the arc-shaped line 5—5 of Fig. 1, and illustrating the top portion of the side walls of the casing near its periphery, and also the rotating web and one of the piston blades; Fig. 6 is a fragmentary section taken along the arc-shaped line 6—6 of Fig. 1, and showing portions of the side walls of the casing near the bottom thereof, and illustrating the inlet and exhaust ports and also the rotating web and one of the piston blades; Fig. 7 is a section similar to Fig. 6 illustrating a modification of the apparatus; Fig. 8 is a section showing a modification in the means for bringing about the turning movement of the piston blades; Fig. 9 is a section on the line 11—11 of Fig. 10 illustrating a further modification of the invention; Fig. 10 is a horizontal section of same on the line 12—12 of Fig. 9; and Fig. 11 is a detail section of the rotating element of the form shown in Figs. 9 and 10.

Reference will first be had to Figs. 1 to 6. The casing is formed with two side walls, each comprising tubular portions or sleeves 15 connected to rounding hub-like portions 16, outward from which are the side walls proper 17, as shown best in Fig. 2. 18 indicates a base which may be formed integral with or attached to the sleeves 15 and serve to sustain the apparatus. This base is provided at each side with openings 19 for the inlet and outlet of the air currents, and these openings are provided with damper valves 20 arranged to swing on pins 21, which are provided with a suitable means 22 to facilitate the operation of the valves.

Turning freely in the sleeves 15 is a driving shaft 23 which may be sustained wholly in said sleeves or in additional supports, if desired. As here shown this shaft is sectional to facilitate assembling the parts. As shown best in Fig. 3 the shaft 23 has a rounding part 24 fitting in corresponding parts 16 of the casing, and encircling the rounding part 24 of the shaft 23 is a circular web 25 which may be formed integral with or attached to said part 24, as desired, and which is provided with sector-shaped openings 26, one for each of the piston blades. In the form illustrated there are two of such openings 26. The web 25 is also provided with a number of relatively narrow radial slots 27 permitting the free circulation of the fluid from one side to the other of the web. Suitably connected with the peripheral part of the web 25 are flanges 28 arranged one at each side of the web and having true but sliding contact with the outer edges of the side walls 17 of the stationary casing.

Fig. 4 shows in detail one of the piston blades which comprises a fan-shaped or sector-like blade proper 29 of elliptical cross sectional form, as shown best in Figs. 5 and 6. At the base of said blade is a rounding enlargement 30 with miter gear teeth 31 thereon, and projecting from the said enlargement 30 is a trunion 32 co-incident to the longitudinal axis of the blade. From the other or large end of the blade a trunnion 33 projects also co-incident to the longitudinal axis of the blade. The enlargement 24 of the shaft 23 is formed with two cavities, in which said enlargement 30 of the piston blade is fitted, and the trunnion 32 of said blades is mounted to roll freely in the shaft, as shown in Fig. 2. The outer trunnions 33 are mounted in the peripheral portion of the web 25, and are preferably fitted with ball bearings as shown in Figs. 1 and 2. The gear teeth 31 mesh with teeth 34 which are formed in the inner end of one of the sleeves 15. The blades fit true in the openings 26 of the web 25 and are thus allowed to turn with said web around the axis of the shaft 23. This swinging movement of the blades by reason of the coaction of the gears 30 with the stationary gear 34 causes the blades to simultaneously turn around their longitudinal axes. The form of the side walls 17 is so calculated that the edges or edge portion of the blades 29 will notwithstanding this turning movement contact with the interior surfaces of the side walls, as may be seen from the different positions illustrated in Figs. 5 and 6. As shown best in Fig. 6, the side walls 17 of the casing are provided at one side with an inlet port 35 and at the other side with an outlet port 36. In Fig. 1 the port 35 is partly illustrated, the web 25 being broken away for this purpose, and in Fig. 1 the relative position of the port 36 is indicated by the broken lines, at the lower right hand portion of said figure.

In the operation of the invention as a pump or compressor, turning movement being imparted to the shaft 23 the piston blades will be caused to sweep through the casing and to simultaneously turn and maintain true contact with the inner surfaces of the casing walls. When one of the piston blades reaches the position shown in Fig. 6, assuming that the parts are running in the direction indicated by the arrow applied to Fig. 5, the piston blade in continuing its movement will pass beyond the inlet port 35, and it will compress the fluid ahead of it and simultaneously suck into the inlet port the fluid which will be subsequently compressed by the piston blade next following. The piston blade continues its swinging and turning movement, as is indicated also in Fig. 5, until it returns to the lower part of the casing. The air or other fluid compressed ahead of the blade will be forced out through the port 36, and the operation of the blade will be repeated. It will be observed that the radial slots 27 in the web 25 permit free circulation through the web and insure equal pressures on both sides thereof. As shown in Fig. 6, however, these slots are not sufficiently wide to permit leakage past the narrow bottom portion of the casing, the casing walls contacting at this point with the web over a sufficient surface to blank the slots as they successively pass the contacting point. During this operation the valves 20 will, of course, be open to permit the entry of air into the pump and discharge the air from the same.

Fig. 7 shows a slight modification which may be resorted to if desired, and this consists in replacing the web 25 by spokes 37. This gives a greater capacity to the casing and by forming the piston blade 29$^a$ relatively narrow as shown it permits of further contacting the casing at its narrow bottom portion.

The modification shown in Fig. 8 consists in the application to the shaft 23 of a pinion gear 45 either formed on or fastened to the shaft and in mesh with a gear 46 which is arranged to turn loosely in a suitable box 47 formed on or fastened to the casing of the apparatus. Said gear 46 has connected to turn therewith a gear 47$^a$, and this gear is in mesh with the spur teeth of a combined spur and miter gear 48. The miter teeth of this gear 48 are intended to mesh with the teeth 31 formed on the semi-spherical enlargements 30 of the piston blades. It is obvious that still other forms of gears or gearing may be resorted to for imparting the characteristic turning movement to the piston blades.

Reference will now be had to Figs. 9, 10, and 11. In this form of the invention the casing 49 is stationary, and is formed with inlet openings 50 and outlet openings 51. One side of the casing is formed with a central bearing 52, in which is loosely fitted the driving shaft 53. Said shaft as shown best in Fig. 11 has a circular web 54 attached, which projects through an opening in the periphery of the casing 49, and this web has at each side a flange 55 curved concentrically to the axis of the shaft 53 and broken at the points 56 to receive the piston blades. The shaft has a trunnion-like part 57 formed on its inner end, and this is suitably mounted in a bearing 58 formed on or carried by an elliptical-shaped protuberance 59 projecting from the wall of the casing 49 opposite that having the bearing 52, inward to the middle portion of the casing. The piston blades 60 are arranged to operate in pairs, one member of each pair lying at each side of the web 54, and said members being connected by shafts 61 which are arranged to turn freely in suitable openings formed in the web. Any desired structure may be resorted to for facilitating assembling these parts. The piston blades thus arranged lie respectively in the openings 56 of the flanges 55 so that they may turn freely therein around the shafts 61. One member of each pair of piston blades is formed with spur gear teeth 62, and these teeth are in mesh with intermediate gears 63 attached to stud shafts 64 loosely mounted in the web 54. Said intermediate gears 63 are in mesh with pinion teeth 65 formed on or fastened to the said protuberance 59 of the casing 49. Upon applying rotary movement to the shaft 53 the parts 54 and 60 are swung bodily around through the casing 49, as illustrated in Fig. 9, and owing to the coaction of the gears 62, 63 and 65 the piston blades are given a simultaneous turning movement around the longitudinal axis of the blades, which in this instance happens to be parallel to the shaft 53. It will be observed, therefore, that the piston blades have essentially the same action as that attributed to them in the preceding description: said blades turning to keep their edge portions in contact with the inner walls of the casing 49 which include, as a part thereof, the inner surfaces of the protuberance 59, and said casing being so formed and proportioned as to enable this action to take place. The air or other fluid is, therefore, drawn into the opening 50 and forced out through the opening 51, as indicated by the arrows in Fig. 9.

As hereinbefore intimated, either the casing or the rotating piston may be the revolving member.

Having thus described the preferred form of my invention, I claim as new and desire to secure by Letters Patent:

1. A pump or motor, comprising a casing provided with inlet and outlet ports, a circular web within the casing and a piston mounted in the web to rotate on an axis transverse to the axis of the casing, and means for relatively rotating the piston and the casing.

2. The combination of a casing having inlet and outlet ports, a radial web revolving within the casing, and piston blades mounted upon axes transverse to the axis of the web to rotate within openings in the web simultaneously with their revolution with the web.

3. The combination of a circular web, radial, rotating pistons mounted in the web, and a casing formed to have continuous contact with both the piston blades and the web.

4. In combination, an annular casing having inlet and outlet ports, piston blades mounted for rotation and arranged radially of the casing, and means for simultaneously rotating the blades and revolving the said blades around the axis of the casing twice for each complete rotation of a blade.

5. The combination of an annular casing having inlet and outlet ports, a revolving web carrying a circular flange in running contact with the casing, and piston blades mounted on the web to revolve through the casing and simultaneously to continually rotate on their own axes.

6. The combination of an annular casing having inlet and outlet ports, a revolving web carrying a circular flange in running contact with the casing, piston blades mounted on the web to revolve through the casing, and means to completely rotate said blades on their own axes once while making two revolutions with the web through the casing.

7. The combination of a casing of annular form having inlet and outlet ports, a rotary shaft, a web connected to turn with the shaft and carrying a flange having running engagement with the walls of the casing, and piston blades mounted to turn with the web through the casing and to continuously rotate on their own axes.

8. The combination of a casing of annular interior form having a contracted and an enlarged portion and inlet and outlet ports, and piston blades mounted to move bodily through the casing around the axis thereof and simultaneously to continuously rotate on their own axes.

9. In combination, a casing having contracted and enlarged portions within the casing and having inlet and outlet ports, a piston blade mounted radially for rotation within the casing, and means for imparting relative movement to the casing and the blade.

10. The combination of a casing of annular form having contracted and enlarged portions and inlet and outlet ports, a rotary shaft, a web connected to turn with the shaft and run within the casing, and piston blades mounted on the web to continuously rotate on their own axes and to move with the web through the casing.

11. The combination of a casing of annular form having a contracted and an enlarged portion and inlet and outlet ports, a circular web revolving in running contact with the casing, and piston blades mounted on the web to move therewith through the casing and simultaneously to continuously rotate on their own axes.

12. The combination of a casing of annular form having contracted and enlarged portions and inlet and outlet ports, a rotary shaft, a web connected to turn with the shaft and through the casing in running contact with the contracted portion thereof, and piston blades mounted to turn with the web through the casing simultaneously to continuously rotate on their own axes.

13. The combination of a casing of annular form having contracted and enlarged portions and inlet and outlet ports, a rotary shaft, a web connected to turn with the shaft and carrying a flange having running engagement with the walls of the casing, and piston blades mounted to turn with the web through the casing and simultaneously to continuously rotate on their own axes.

14. The combination of a shaft, a web connected with the shaft, rotating piston blades mounted upon axes transverse to the axis of the web within openings in the web, and a casing loosely mounted on the shaft in running contact with the web and pistons and having inlet and outlet ports.

15. The combination of a rigid circular casing having oppositely situated side walls, a rotary shaft located centrally in the casing, a circular web attached to the rotary shaft and running in the casing, flanges carried by the peripheral portion of the web and having running engagement with the outer edges of the side walls of the casing, and a piston blade supported by the web and moving therewith through the casing, the casing having inlet and outlet openings for the purpose specified.

16. The combination of a rigid circular casing having oppositely situated side walls, a rotary shaft located centrally in the casing, a circular web attached to the rotary shaft and running in the casing, flanges carried by the peripheral portion of the web and having running engagement with the outer edges of the side walls of the casing, a piston blade supported by the web and moving therewith through the casing, the casing having inlet and outlet openings for the purpose specified, the piston blade being mounted to turn on the web independently of its movement with the web, and means for positively turning the blade on the web simultaneously with the movement of the blade with the web, the casing also having an interior form corresponding to the figure described by the side edges of the blade by its said movement in the casing.

17. The combination of a rigid circular casing having opposing side walls, a rotary shaft passing centrally through the casing, a circular web carried by the shaft and running on the casing, flanges attached to the peripheral portion of the web and having running engagement with the outer edges of said walls of the casing, the web having an opening therein, and a series of slots, the latter for the purpose specified, a piston blade carried by the web and pivotally mounted within the said opening thereof, and means for positively rotating the piston blade independently and during its movement with the web, said casing having inlet and outlet openings and also having an interior form corresponding to the figure described by the side edges of the blade during its said movements in the casing.

18. The combination of a cylindrical casing, a shaft journaled in the casing and coaxial therewith, said shaft having a lateral circular web provided with openings therethrough, and with laterally projecting peripheral flanges contacting with the walls of the casing, piston blades journaled in the openings and rotating upon an axis perpendicular to the axis of the shaft, and means in connection with the casing for positively rotating the blades during the relative movement of the web and casing, said web being provided with slots therethrough intermediate the openings, and said casing having an interior form corresponding to the figure described by the side edges of the flanges during their movement through the casing.

19. The combination of a casing having enlarged and contracted portions and inlet and outlet ports, a web having running contact with the peripheral and the narrow parts of the casing, and continuously rotating pistons mounted in the web upon axes transverse to the axis of the web.

20. An annular casing, a web within the casing, and continuously rotating pistons mounted on the web, the casing being a running fit to both pistons and web, the pistons being mounted upon axes transverse to the axis of the web.

21. A casing having enlarged and contracted portions, and a radial piston within the casing, a web stationary relative to the axis of the piston, said casing and piston having relatively circular movement and the pistons having simultaneously a continuous rotary movement on its own axis.

22. The combination of a casing and pistons located in the casing, but without the center thereof, portions of a web between the pistons, the casing and the pistons having a relatively circular movement and the pistons having simultaneously a continuous rotary movement on their own axes.

23. The combination of an annular casing and pistons located within the casing outward from the center thereof, a web within the casing, the casing and the piston having relatively revolutionary movement on the axis of the casing and the pistons having a simultaneous rotary movement on their own axes upon axes transverse to that of the casing, the casing having a varying interior dimension in conformity with the movement of the pistons.

24. In combination, a casing having inlet and outlet ports, pistons mounted radially within the casing, a web within the casing, the casing and the pistons arranged one to revolve in running contact with the other, and means whereby said revolution will rotate the pistons on their own axes.

In testimony whereof I have signed my name to this specification in the presence of two subscribing witnesses.

FRANK REAUGH.

Witnesses:
A. F. SPILMAN,
H. W. CRUISE.